United States Patent [19]

Yamamoto Naohiro et al.

[11] Patent Number: 4,865,417
[45] Date of Patent: Sep. 12, 1989

[54] OPTICAL FIBER DEVICE

[75] Inventors: Yamamoto Naohiro; Shuichiro Tokuda, both of Aichi, Japan

[73] Assignee: Mitsubishi Rayon Co., Ltd., Tokyo, Japan

[21] Appl. No.: 63,318

[22] Filed: Jun. 18, 1987

[30] Foreign Application Priority Data

Jun. 18, 1986 [JP] Japan .............................. 61-91925[U]

[51] Int. Cl.$^4$ ............................................... G02B 6/02
[52] U.S. Cl. ................................. 350/96.30; 350/96.15
[58] Field of Search ............... 350/96.29, 96.30, 96.33, 350/96.34, 96.15

[56] References Cited

U.S. PATENT DOCUMENTS

| 4,130,343 | 12/1978 | Miller et al. | 350/96.15 |
| 4,423,922 | 1/1984 | Porter | 350/96.15 |
| 4,542,957 | 9/1985 | Ishiwari et al. | 350/96.30 X |
| 4,715,700 | 12/1987 | Daniel | 350/96.10 X |
| 4,765,701 | 8/1988 | Cheslak | 350/96.19 X |

Primary Examiner—John D. Lee
Assistant Examiner—Phan T. Heartney
Attorney, Agent, or Firm—Oblon, Spivak, McClelland, Maier & Neustadt

[57] ABSTRACT

An optical fiber device comprises a core and a cladding, the core being made of an optical material having a refractive index $n_1$, and the cladding being made of an optical material having a refractive index $n_2$, the end of the optical fiber from which light radiates forming a plane that is inclined to the fiber axis by an angle $\theta$, a light reflective layer being formed at least on the outer periphery of said radiating end, and the two reractive indices $n_1$ and $n_2$ satisfying the following relation (1):

$$n_1 - n_2 \geq 0.01 \qquad (1).$$

6 Claims, 3 Drawing Sheets

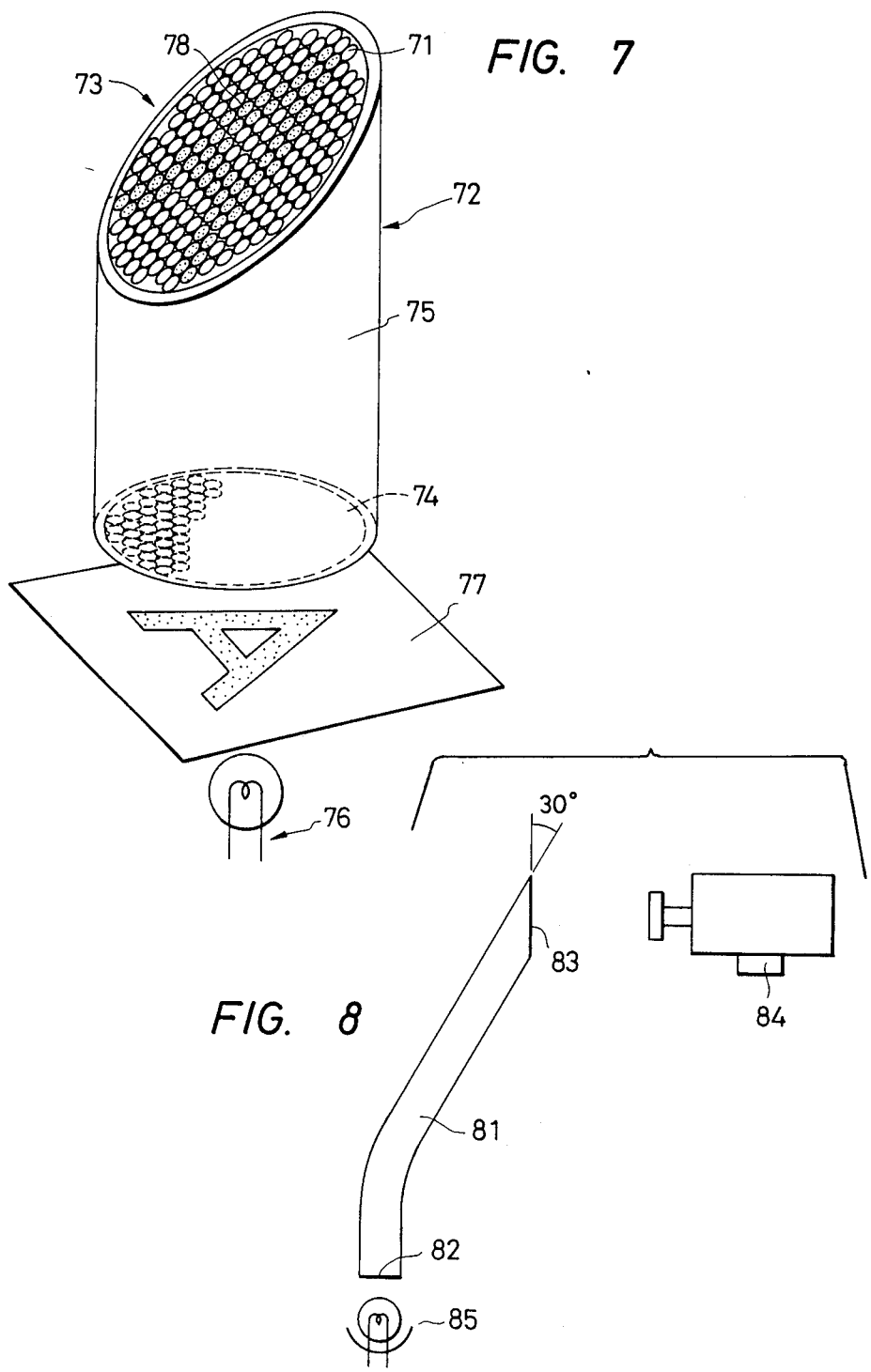

OPTICAL FIBER DEVICE

BACKGROUND OF THE INVENTION

The present invention relates to light transmitting optical fiber device. More particularly, the present invention relate to a light transmitting optical fiber device having its light radiating end shaped and constructed in a specified fashion and which can advantageously be used in an optical display system.

A related art optical display system using an array of multiple optical fibers is shown in Japanese Patent Application Laid Open No. 198406/1984. In this system, optical fibers with their light radiating end surfaces formed perpendicular to the fiber axes are embedded in a certain array in a display panel and are bundled together at the other end which faces a light source. Each of the optical fibers with their light radiating end faces being perpendicular to the fiber axes has such a small diameter (10 μm to a few mm) that the total cross-sectional area of the fibers that occupy the area in which a display is to be made is inevitably very small, and in order to fabricate an optical display unit having a desired display area, a huge number of optical fibers must be employed. Another problem associated with the use of optical fibers having their light radiating surfaces cut perpendicular to the fiber axes is that even if the fibers are made of or plastics, the angle of light radiation form the fiber ends is not more than ±30° with respect to the optical axis and the resulting optical display is highly directive, rather than featuring a wide visual angle.

Optical fiber display systems that are designed to maximize the area of display surface are shown in Japanese Patent Application Laid Open Nos. 86709/1986, 71782/1986 and U.S. Pat. No. 4,116,739. The optical fiber array portion of these display systems is shown in FIG. 4 (perspective view) and in FIG. 5 (a cross-sectional view). Multiple optical fibers (41) arranged in the two directions of y-and z-axes are positioned to face a light source at one end so as to form an image receiving surface (44), with other end of the fiber array being inclined to the x-axis direction of fiber axis so as to provide an enlarged display surface (45). As shown in FIG. 4, an incident image (42) is displayed as an enlarged image (43) on the surface (45). As shown in FIG. 5, each of the incident rays (56) that encounter the image receiving surface (44) is guided through an individual optical fiber (51) in the direction of the arrow as it undergoes repeated internal reflection without escaping to the outside of the fiber, and emerges from the display surface (45). In this type of optical display system, the total cross-sectional area of the display surface is large compared with the total cross-sectional area of the image receiving surface so that the images provided by the individual fibers are not bright enough to produce a sharp overall display.

As shown in FIG. 6(A), the angle of light radiation from an end (62) of an optical fiber (61) that is perpendicular to the fiber axis covers the range of ±30°. If the optical fiber has a light radiating end (63) which, as shown in FIG. 6(B), is inclined to the fiber axis, rays of light radiating from this end have high directivity in the direction of the fiber axis as illustrated by (64) and (65), with the result that the visual angle of the display system becomes narrower than in the case shown in FIG. 6(A). As a further problem, some of the rays of light propagating through the optical fiber (61) are reflected by the inclined radiating face (63) and the reflected ray (66) leaks from the fiber (61) by passing through the fiber wall (67) that is situated below the imaging surface. Because of this optical loss, the quantity of light radiating from the imaging surface is insufficient to produce a bright display.

SUMMARY OF THE INVENTION

An object, therefore, of the present invention is to provide an improved optical fiber device having a light radiating end that provides a wide visual angle without causing a loss in the quantity of light propagating through the fiber.

This object of the present invention can be attained by an optical fiber device composed of a core and a cladding, the core being made of an optical material having a refractive index $n_1$, and the cladding being made of an optical material having a refractive index $n_2$, the end of the optical fiber from which light radiates forming a plane that is inclined to the fiber axis by an angle $\theta$, a light reflective layer being formed on the outer periphery of said radiating end, and the two refractive indices, $n_1$ and $n_2$, satisfying the following relation (1):

$$n_1 - n_2 \geqq 0.01 \tag{1}$$

If the difference between $n_1$ and $n_2$ is less than 0.01, transmission loss occurs in the optical fiber, so that it is essential for the purpose of the present invention that relation $n_1 - n_2 \geqq 0.01$ be satisfies in all cases.

BRIEF DESCRIPTION OF THE DRAWINGS

FIG. 7 is a schematic view of an optical display system using the optical fiber devices of the present invention, and FIG. 8 is a schematic view of the configuration for measuring the luminance of light from the optical devices of the present invention.

DETAILED DESCRIPTION OF THE PREFERRED EMBODIMENTS

The optical fibers for use in the optical device of the present invention may be formed from either silicate (quartz) systems or plastic systems but the latter systems are preferred since they are highly flexible and amenable to precise end preparation. Plastics suitable for this purpose include: polymethyl methacrylate, polymethyl glutarimide ($n=1.49$) and methyl methacrylate based copolymers ($n=1.47-1.50$); polystyrene ($n=1.58$) and styrenebased copolymers ($n= 1.50-1.58$); styrene/acrylonitrile copolymer ($n=1.56$); poly-4-methylpentene-1 ($n=1.46$); ethylene/vinylacetate copolymers (n=1.46–1.50); polycarbonates (n=1.50–1.57); polychlorostyrene (n=1.61); polyvinylidene chloride (n=1.63); polyvinyl acetate (n=1.47); methyl methacrylate/styrene (or vinyltoluehe or α-methylsyrene)/maleic anhydride terpolymer or quaternary polymer (n=1.50–1.58); polydimethyl-siloxane (n=1.40); polyacetal (n=1.48); polytetrafluoroethylene (n=1.35); polyvinylidene fluoride (n=1.42); polytrifluoroethylene (n=1.40); perfluoropropylene (n=1.34); co- or terpolymers of fluoroethylene (n=1.35–1.40); blend polymers of polyvinylidene fluoride and polymethyl methacrylate (n=1.42–1.46); polymers based on fluorinated methacrylates of the general formula $CH_2=C(CH_3)COORf$ including those wherein Rf is $(CH_2)_m(CF_2)_lF$ (m=interger of 1–6; 1=integer of 1–10; n=1.37–1.40), Rf is —$(CH_2)_m(CF_2)_lH$ (m and l are the same as defined above: n=1.37–1.42), Rf is —$CH(CF_3)_2$ (n=1.38), Rf is —$C(CF_3)_3$ (n=1.36), Rf is —$CH_2CF_2CHFCF_3$ (n=1.40), and Rf is —$CH_2CF(CF_3)_2$ (n=1.37); copolymers of these fluorinated methacrylates (n=1.36–1.40); copolymers of these fluorinated methacrylates and methyl methacrylate (n=1.37–1.43); polymers based on fluorinated acrylates of the general formula $CH_2=CH.COOR'f$ including those wherein R'f is —$(CH_2)_m(CF_2)_lF$ (m and l are the same as defined above; n=1.37–1.40), R'f is $(CH_2)_m(CF_2)_lH$ (m and l are the same as defined above; n=1.37–1.40), R'f is —$CH_2CF_2CHFCF_3$ (n=1.41), and R'f is —$CH(CF_3)_2$ (n=1.38); copolymers of these fluorinated acrylates (n=1.36–1.41); copolymers of these fluorinated acrylates and the above mentioned fluorinated methacrylates n=1,36–1.41); copolymers of these fluorinated acrylates, fluorinated methacrylates and methyl methacrylate (n=1.37–1,43); homo- or copolymers (n=1.37–1.42) based on 2-fluoroacrylates of the general formula $CH_2=CF.COOR''f$ including those wherein Rf'' is —$CH_3$, —$(CH_2)_m(CF_2)_nF$, —$(CH_2)_m(CF_2)_nH$, —$CH_2CF_2CHFCF_3$ AND $C(CF_3)_2$; and fluorine-containing alkyl fumarate ester polymers (n-1.30–1.42).

These polymers may be appropriately combined to form a core and a cladding in optical fiber that satisfy the condition set forth by the relationship (1).

Figure 1:
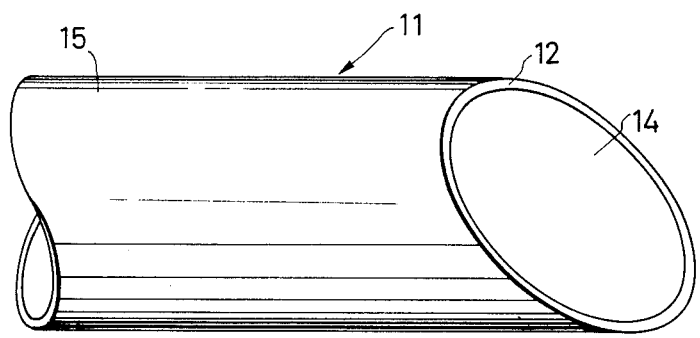
FIG. 1 is a perspective view of the light radiating portion of the optical fiber device according to a first embodiment of the present invention.

FIG. 1 is a perspective view of the light radiating portion of the optical fiber device according to a first embodiment of the present invention: reference numeral 11 denotes an optical fiber with a core-cladding structure; (12), a light reflective layer formed directly on the core surface of the fiber; (14), a light radiating surface that is inclined by an angle θ with respect to the fiber axis; and (15), the cladding layer.

Figure 2:
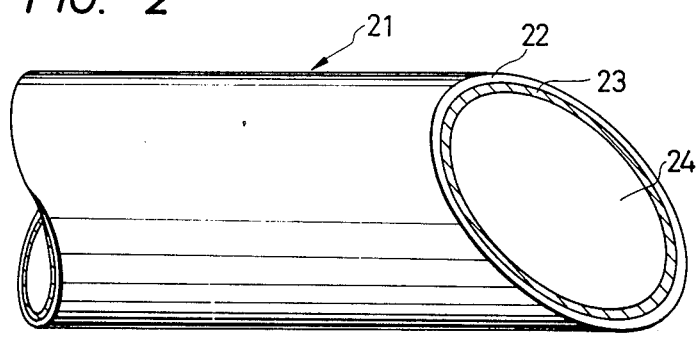
FIG. 2 is a perspective view of the light radiating portion according to a second embodiment of the present invention.

FIG. 2 is a perspective view showing a second embodiment of the light radiating portion: reference numeral (21) denotes an optical fiber; (24), a light radiating surface that is inclined by an angle θ with respect to the fiber axis; (23), the cladding layer; and (22), a light reflective layer.

The light reflective layer is formed on the outer periphery of the light-radiating end of each optical fiber by a suitable known technique such as sputtering, ion plating or coating with a light-reflective paint. If the sputtering or ion plating technique is employed, silver, nickel, aluminum or alloys thereof may be used as a light-reflective layer forming material and it is particularly preferable to use materials that absorb less of the intrinsic oscillation that occurs in the visible range of the spectrum. If the light-reflective layer is formed by sputtering, a low-temperature sputtering apparatus is preferably employed in order to prevent the optical fiber being thermally damaged by the heat of condensation of the target metal or the radiation heat thereof.

A suitable light-reflective paint is one which contains a titanium oxide, aluminum, nickel or silver powder as a light-reflective pigment.

Figure 3:
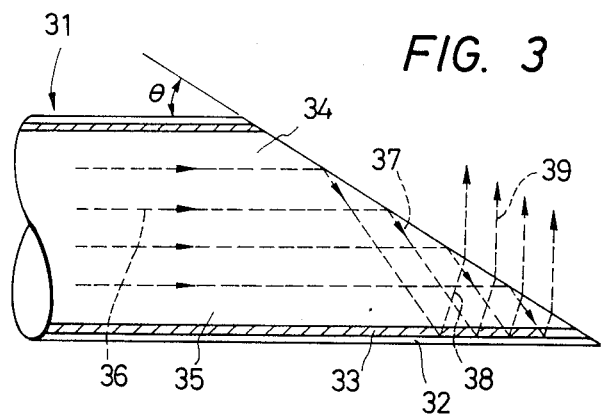
FIG. 3 is a sectional view of the optical fiber device illustrating the mechanism according to the present invention.
Figure 4:
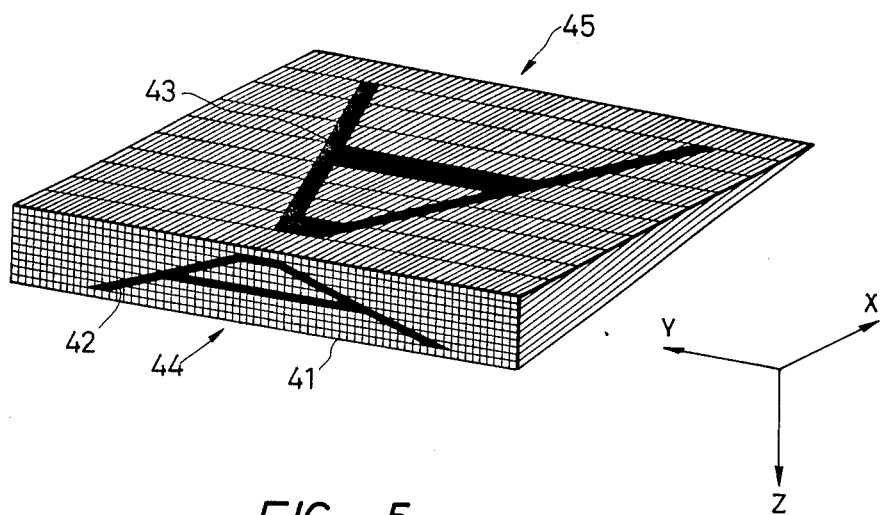
FIG. 4 is a perspective view of a conventional display system.
Figure 5:
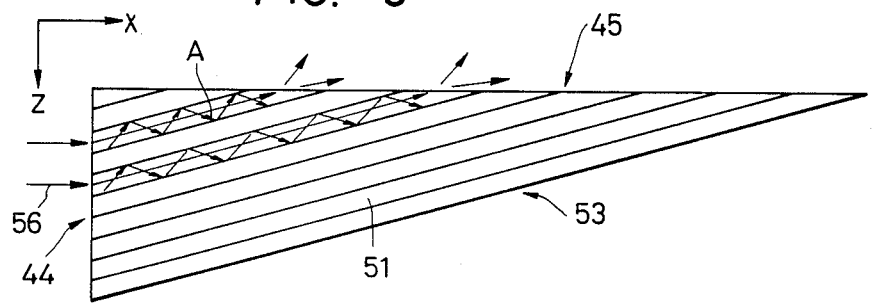
FIG. 5 is a sectional view of the conventional display system of FIG. 4, FIGS. 6(A) and 6(B) are sectional views of conventional optical fibers, respectively.
Figure 6A:
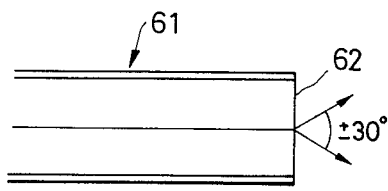
Figure 6B:
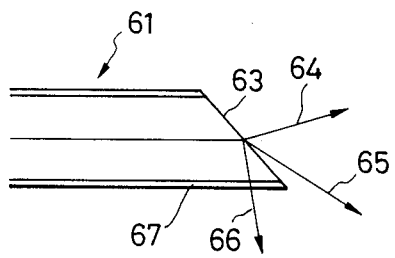

The mechanism by which the optical fiber device of the present invention enables light to emerge from the radiating end of each optical fiber without attenuation is shown schematically in FIG. 3, in which reference numeral (31) denotes the optical fiber device; (32), a light-reflective reflective layer, (33), the cladding layer; (35), the core; and (34), the light radiating end of the fiber which is inclined by an angle θ with respect to the fiber axis. Rays of light (36) travelling straight through the fiber core are reflected by the inclined radiating surface (34) to change direction as indicated by (37) are further reflected by the reflective layer (32) and thereafter emerge from the radiating surface (34) as outgoing rays (39). In the absence of any leakage of light such as the one indicated by ray (66) in FIG. 6(B), the optical device of the present invention allows light with a very high degree of luminance to issue from its radiating end. In addition, the device is not only capable of changing the visual angle of light indicated by (64) and (65) in FIG. 6(B) but also of increasing such angle by means of the reflected light (39) shown in FIG. 3 Because of these advantages, the optical device displays an image that is discernible from a distant point and which can be seen over a wide visual angle.

In the optical device of the present invention, the light-reflective layer is formed on at least the outer periphery of its light-radiating end. Preferably, this reflective layer is formed in such a region that the rays of light reflected from the radiating surface that is inclined at angle θ relative to the fiber axis are effectively reflected by this layer to emerge from said radiating surface. If desired, the reflective layer may be formed over the entire length of the optical fiber. Equally good results are attained even if the cladding layer is eliminated from that portion of the optical fiber where the reflective layer is to be formed. The smaller the angle θ, at which the light-radiating end of the optical fiber is inclined relative to the fiber axis, the larger the area of that radiating surface and hence the better. However, preferably, θ is set at 70° or below, with the range of 5°–60° being more preferable.

FIG. 7 is a schematic drawing of an optical display system (72) that is composed of an array of the optical fiber devices of the present invention. As shown in the drawing, individual optical devices (71) are arranged in such a manner that their light-radiating ends which are inclined at angle θ relative to the fiber axes are in one cross-sectional plane to form an image display surface (73), whereas the other end of each optical fiber device is perpendicular to the fiber axis so as to form an image input surface (74). The assembly of the fibers is placed in a protective tubular sheath (75). When the sheathed assembly is positioned in such a way that the image input surface (74) is directed to a light source (76) with an image projecting filter (77) inserted therebetween, an enlarged image (78) will be produced on the display surface (73). The displayed image is very bright and features a wide visual angle.

Alternatively, a display portion may be formed by embedding the inclined light-radiating ends of the optical fiber devices of the present invention at given spacings in a display panel of a given shape.

EXAMPLE 1

Four plastic optical fibers (core: polymethyl methacrylate with n=1.49; cladding: fluorinated alkyl methacrylate polymer with n=1.42) produced by Mitsubishi Rayon Company Limited that had an outside diameter of 0.75 mm and a length of 1 m were used as starting materials. One end of each fiber was cut to form a surface that was inclined by 30° relative to the fiber axis, and the other end was made perpendicular to the fiber axis. Two of the fibers were coated with a light-reflective layer on the outer periphery of the inclined end by two different methods, i.e., aluminum evaporation, application of a white paint (containing $TiO_2$ as a reflective material). Another fiber was coated with a black paint on the outer periphery of the inclined end, and the last fiber received no treatment at all.

The luminance of light radiating from the so prepared four optical devices was measured with the configuration as shown in FIG. 8, in which the light-radiating end (83) of each device (81) was directed to luminance meter (84) (Spectral Radiometer Model SR-1 of Tokyo Kogaku Kikai K.K.) with the light-receiving end (82) facing a halogen lamp (85) (24 V, 150W). The result of measurement conducted at a frequency of 380−370 nm are shown in table 1.

TABLE 1

| Run No. | kind of light reflective layer | Luminance (cd/m$^2$) | Remarks |
| --- | --- | --- | --- |
| 1 | non-treatment | 20 | comparative sample |
| 2 | aluminum evaporation | 1013 | sample of the invention |
| 3 | application of white paint | 466 | sample of the invention |
| 4 | appication of black paint | 8 | comparative sample |

EXAMPLE 2

Four pairs of plastic optical fibers that were of the same type as used in Example 1 were cut at one end to form surfaces that were inclined relative to the fiber axes at the angles indicated in Table 2. One fiber of each pair was coated with a white reflective layer on the fiber wall facing the inclined end, and the other member was provided with a light-absorbing black layer in the same area. The so prepared specimens were subjected to luminance measurement as in Example 1 and the results are summarized in Table 2.

TABLE 2

| Run No. | 5 | 6 | 7 | 8 | 9 | 10 | 11 | 12 |
| --- | --- | --- | --- | --- | --- | --- | --- | --- |
| Angle of inclination of fiber end | 10 | | 15 | | 20 | | 45 | |
| Light-reflective layer | white | black | white | black | white | black | white | black |
| Luminance (cd/m$^2$) | 306 | 11 | 324 | 4 | 339 | 6 | 146 | 9 |
| Remarks | A | B | A | B | A | B | A | B |

(A: sample of the invention; B: comparative sample)

As described above, an optical fiber device of the present invention has a light radiating end that is inclined to the fiber axis and a light reflective layer is formed on the periphery of the radiating end, so that a wide visual angle of a display system without causing loss in the quantity of light propagating through the fiber can be attained. The fiber device of the present invention can be used for back illumination to a high luminance type display unit, display panel etc., and is useful in industry.

What is claimed is:

1. A light-transmitting optical fiber device comprising a core being made of an optical material having a refractive index $n_1$ and a cladding being made of an optical material having a refractive index $n_2$, wherein an end of said optical fiber from which light radiates forming a plane that is inclined relative to a fiber axis at an angle $\theta$, a light reflective layer selected from the group of aluminum or white paint, and which is formed at least on the outer periphery of said radiating end and parallel to said cladding layer, the other end of said optical fiber forming a plane that is perpendicular relative to said fiber axis, and said two refractive indices $n_1$ and $n_2$ satisfying the following relation (1):

$$n_1 - n_2 \geqq 0.01 \qquad (1).$$

2. An optical fiber device according to claim 1, wherein said light-reflective layer is formed of a metal coating.

3. An optical fiber device according to claim 1 or 2, wherein said angle $\theta$ is no more than 70° with respect to said fiber axis.

4. An optical fiber device according to claim 3, wherein said angle $\theta$ is within the range of 5°–60°.

5. An optical fiber device according to claims 1 or 2, wherein said optical fiber is made of a plastic.

6. An optical fiber device according to claim 4, wherein said optical fiber is made of plastic.

* * * * *